(12) United States Patent
Lyon

(10) Patent No.: US 8,313,112 B1
(45) Date of Patent: Nov. 20, 2012

(54) SAND SLED

(76) Inventor: Jan Lyon, Honeoye Falls, NY (US)

( * ) Notice: Subject to any disclaimer, the term of this patent is extended or adjusted under 35 U.S.C. 154(b) by 455 days.

(21) Appl. No.: 12/557,400

(22) Filed: Sep. 10, 2009

(51) Int. Cl.
B62B 15/00 (2006.01)

(52) U.S. Cl. .......................................... 280/24; 280/19

(58) Field of Classification Search .................. 280/1.5, 280/845, 18, 18.1, 19, 19.1, 20, 21.1, 22, 280/22.1, 24, 28, 28.12, 28.17, 87.01, 87.043
See application file for complete search history.

(56) References Cited

U.S. PATENT DOCUMENTS

| 875,273 | A | * | 12/1907 | Mouradick | 473/457 |
| 1,646,790 | A | * | 10/1927 | Hornquist | 280/23.1 |
| 1,714,093 | A | * | 5/1929 | Kier et al. | 280/1 |
| 2,139,513 | A | | 12/1938 | Nelson et al. | |
| 3,561,025 | A | * | 2/1971 | Teach | 441/65 |
| 3,927,894 | A | | 12/1975 | Zawislak | |
| 3,952,354 | A | | 4/1976 | Turner | |
| 4,267,615 | A | | 5/1981 | Nealy | |
| 5,076,189 | A | * | 12/1991 | Jones | 114/253 |
| 5,106,109 | A | | 4/1992 | Tattersall et al. | |
| 5,123,371 | A | | 6/1992 | Giordano et al. | |
| 5,181,741 | A | * | 1/1993 | Sheiman et al. | 280/845 |
| 5,222,748 | A | * | 6/1993 | Johnson | 280/8 |
| 6,203,389 | B1 | | 3/2001 | Pearson | |
| 6,357,824 | B1 | | 3/2002 | Whitacre | |
| 6,533,298 | B2 | | 3/2003 | Sims | |
| 2007/0296167 | A1 | | 12/2007 | Beswick et al. | |
| 2008/0224429 | A1 | * | 9/2008 | Watson | 280/19 |
| 2009/0079150 | A1 | | 3/2009 | Maratta | |

FOREIGN PATENT DOCUMENTS

FR 2.548.917 7/1983

* cited by examiner

Primary Examiner — Frank Vanaman
(74) Attorney, Agent, or Firm — Michael I Kroll

(57) ABSTRACT

A sand sled having a base preferably comprising a polymeric or foam board having a an open ended frame attached thereto with rails extending therebetween. As illustrated the back end of the top rail has a length greater than the bottom rail so that a toddler is in a reclined position while being pulled on the sand sled.

4 Claims, 8 Drawing Sheets

SAND SLED

BACKGROUND OF THE INVENTION

1. Field of the Invention

The present invention relates generally to sleds and, more specifically, to a sand sled having a base preferably comprising a polymeric or foam board having an open ended frame attached thereto with rails extending therebetween. As illustrated the back end of the top rail has a length greater than the bottom rail so that a toddler is in a reclined position while being pulled on the sand sled.

The present invention further provides for an alternate embodiment of the present invention wherein the base is comprised of foam board having vertically depending foam board side extending across the back with a positive slope so that the occupant is slightly inclined against the back rest.

2. Description of the Prior Art

There are other sled devices designed for transportation. Typical of these is sleds designed for snow having bottom rails.

While these sleds may be suitable for the purposes for which they were designed, they would not be as suitable for the purposes of the present invention, as hereinafter described.

SUMMARY OF THE PRESENT INVENTION

A primary object of the present invention is to provide a sled that can be used on sand and surf for pulling children thereon Another object of the present invention is to provide a sand sled having a base made from a polymeric or foam board material.

Yet another object of the present invention is to provide a sand sled having at least one fastener for attaching a leash thereto Still yet another object of the present invention is to provide a sand sled having a frame fixedly attached to the base.

Another object of the present invention is to provide a sand sled wherein said frame is comprised of a plurality of stanchions and rails.

Yet another object of the present invention is to provide a sand sled wherein said rails are covered by cushion material.

Still yet another object of the present invention is to provide a sand sled wherein the top rail has a length greater than the bottom material.

Another object of the present invention is to provide a sand sled that is cost effective to manufacture.

An additional object of the present invention is to provide a sand sled comprised of foam board having vertically depending foam board sides extending from each side across the back serving similar function as the rails.

Additional objects of the present invention will appear as the description proceeds.

The present invention overcomes the shortcomings of the prior art by providing a sand sled having a base preferably comprising a polymeric or foam board having a an open ended frame attached thereto with rails extending therebetween. As illustrated the back end of the top rail has a length greater than the bottom rail so that a toddler is a reclined position while being pulled on the sand sled.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
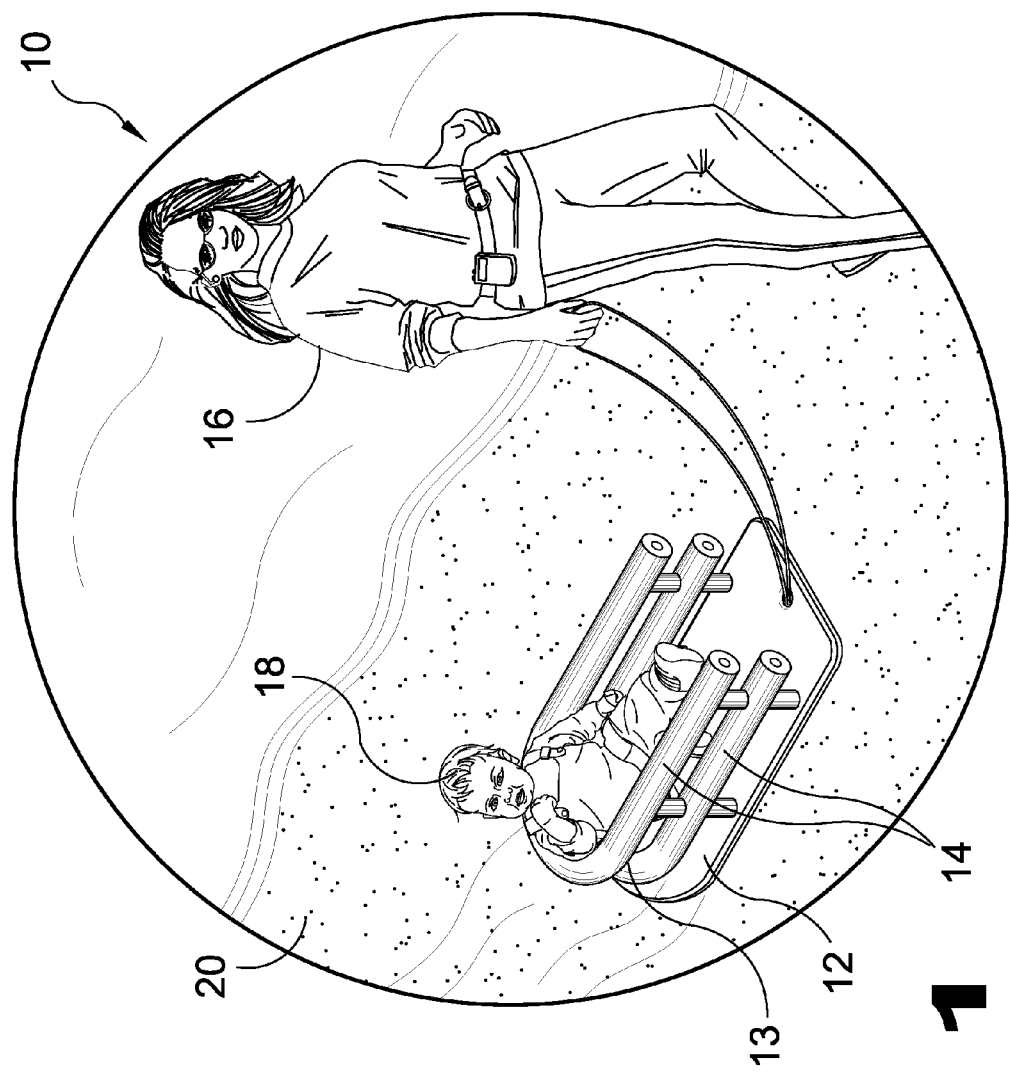
FIG. 1 is an illustrative view of the sand sled of the present invention in use.

Turning now descriptively to the drawings, in which similar reference characters denote similar elements throughout the several views, the figures illustrate the Sand Sled of the present invention. With regard to the reference numerals used, the following numbering is used throughout the various drawing figures.

10 Sand Sled of the present invention
12 base
13 framework
14 rail tier
16 user
18 child
20 sand
22 stanchion
24 top rail tier
26 bottom rail tier
28 rigid core of 14
30 padding of 14
32 leash
34 fastener attachment

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the sand sled 10 of the present invention in use. Depicted is an illustrative view of the sand sled 10 in use having a base 12 preferably comprising a polymeric or foam board having an open ended frame 13 attached thereto with a plurality of rail tiers 14 disposed peripherally thereabove. Shown is the user 16 pulling a child 18 across the sand 20 on the beach.

Figure 2:
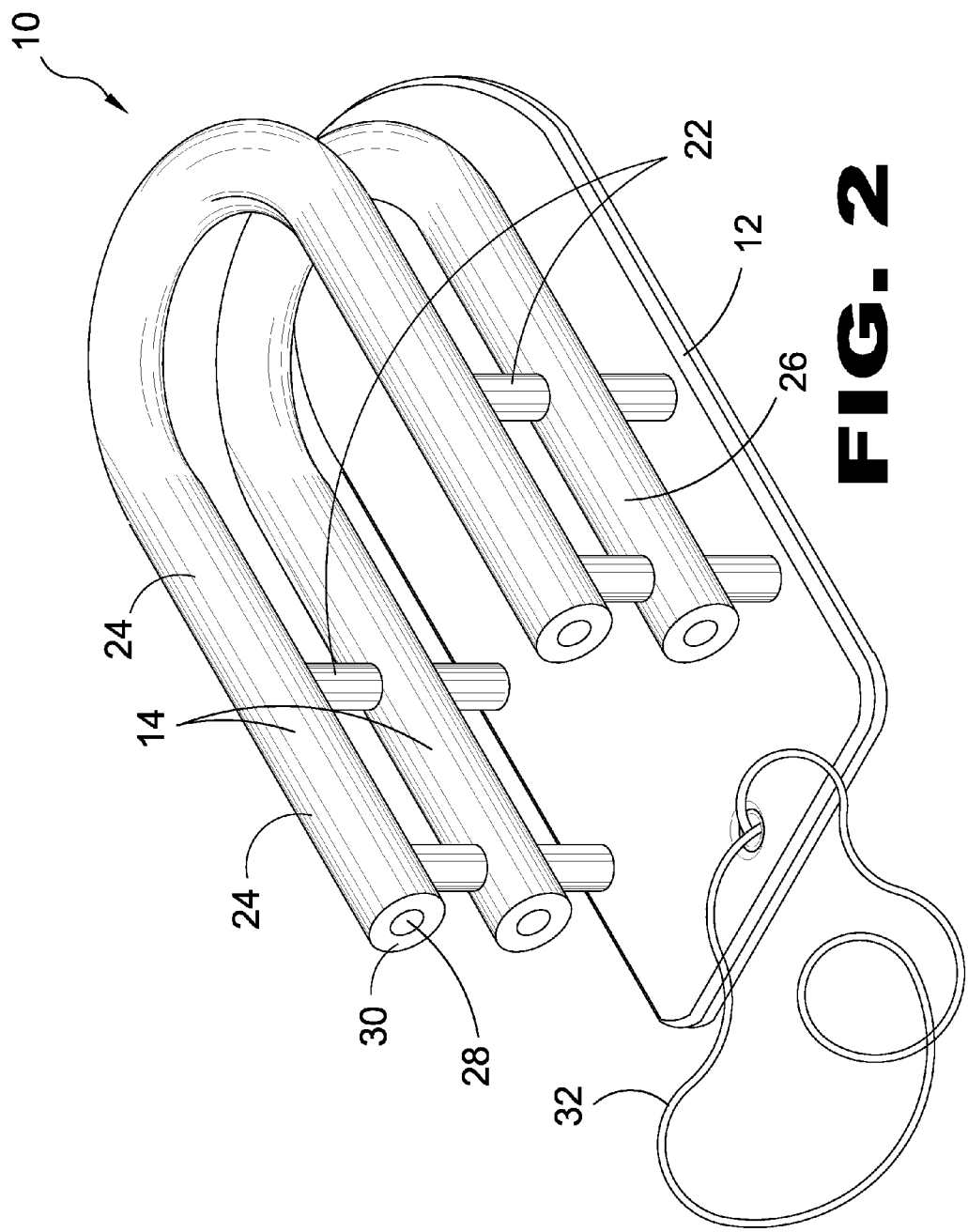
FIG. 2 is a perspective view of the sand sled of the present invention.

FIG. 2 is a perspective view of the sand sled 10 of the present invention. Shown is a perspective view of the sand sled 10 having a base 12 preferably comprising a polymeric or foam board having an open ended frame attached thereto with a plurality of spaced apart rail tiers 14 supported by stanchions 22. Each rail tier 14 comprises a rigid core 28 encompassed by padding 30 such as foam. As illustrated the back end of the top rail tier 24 has a depth greater than the bottom rail tier 26 so that a toddler is a reclined position while being pulled thereon. A leash 32 is included for the user to pull the sand sled 10 and its passenger or cargo.

Figure 3:
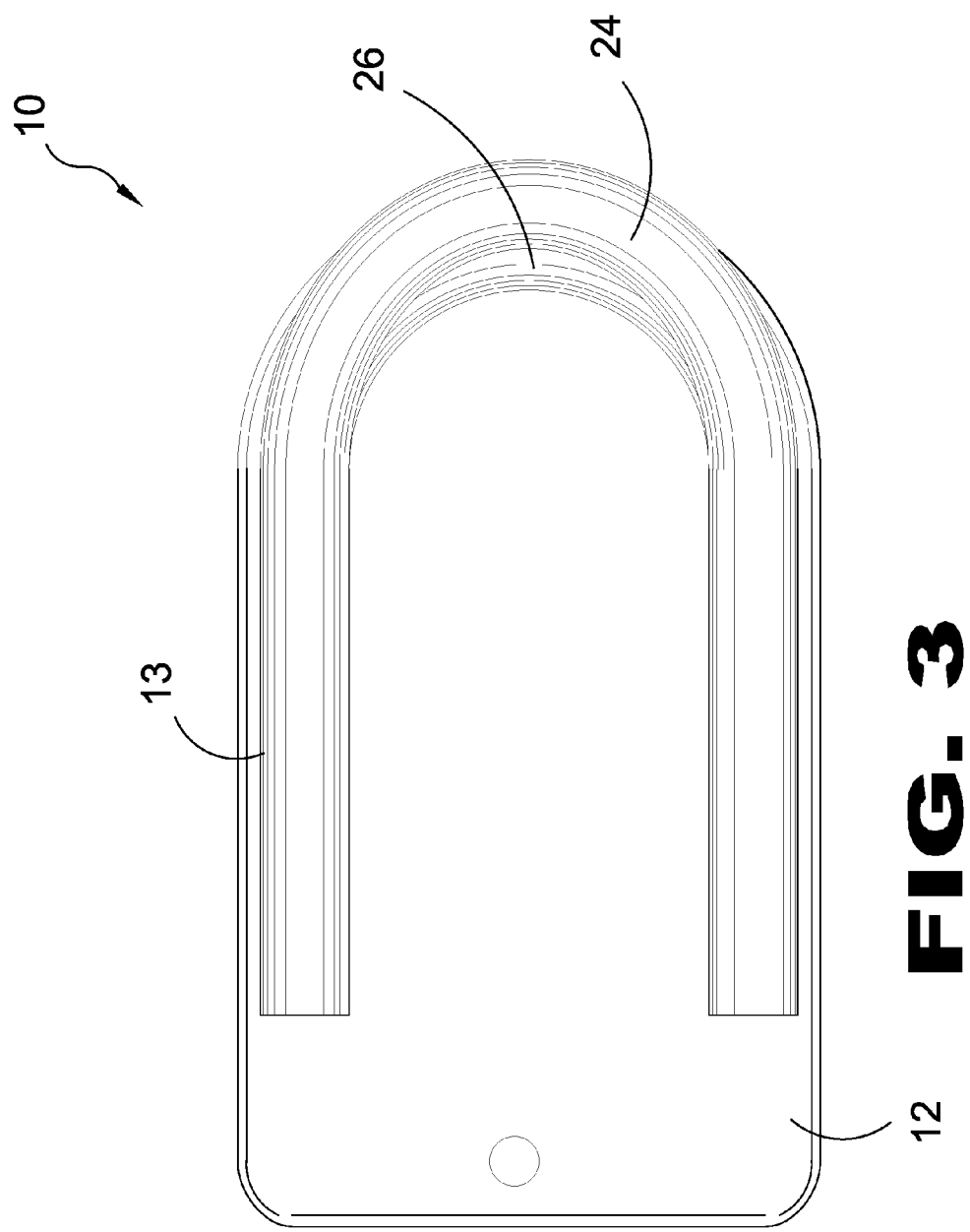
FIG. 3 is a top view of the sand sled of the present invention.

FIG. 3 is a top view of the sand sled 10 of the present invention. Shown is a top view of the sand sled 10 having a base 12 preferably comprising a polymeric or foam board with a frame 13 attached to the top portion thereof. The top rail tier 24 and the bottom rail tier 26 are substantially horseshoe shaped providing and open front end, a curved back end and straight sides. The back end of the top tier 24 extends beyond that of the bottom tier 26 so that the passenger is in a slightly reclined position.

Figure 4:
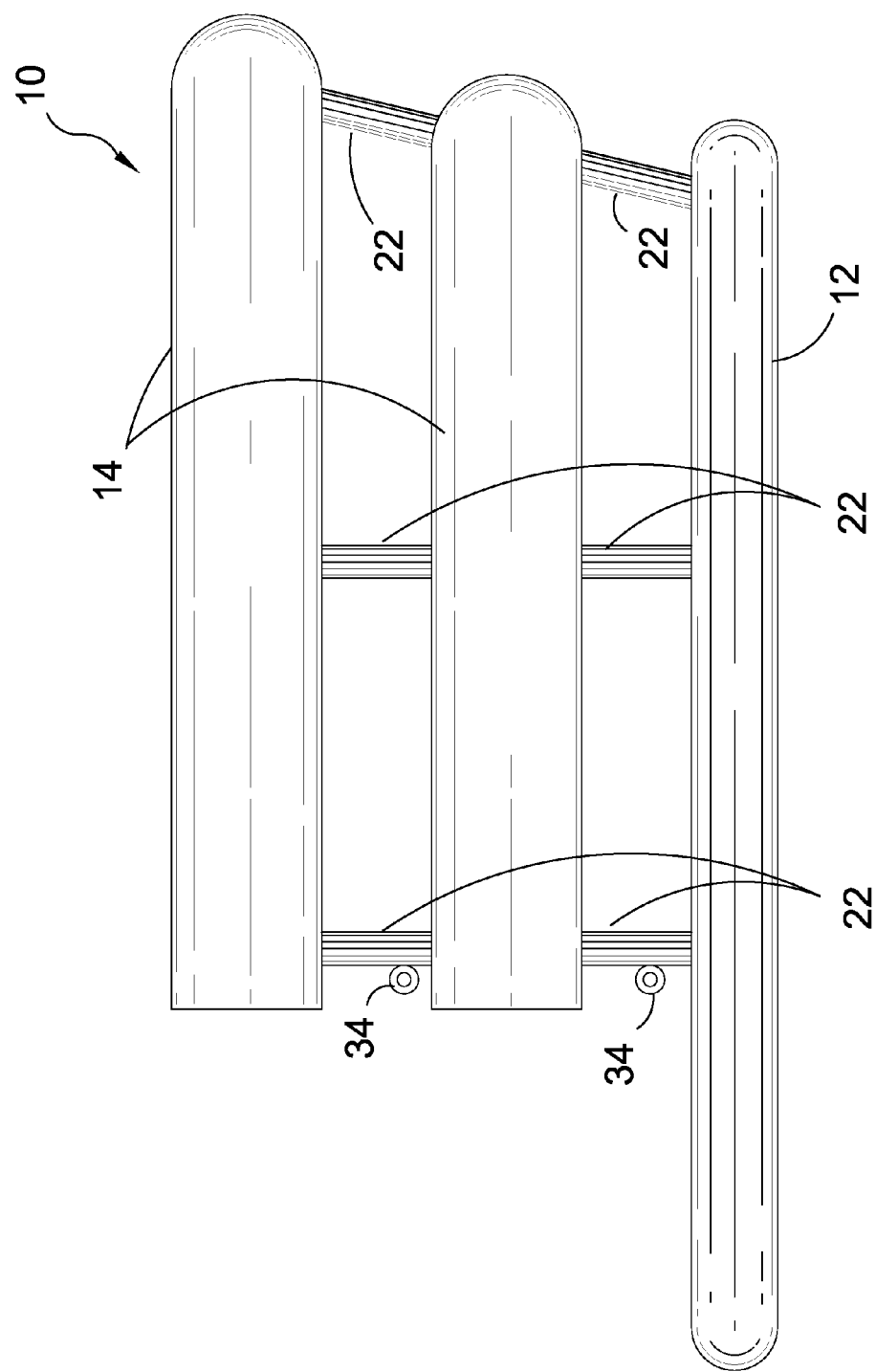
FIG. 4 is a side view of the sand sled of the present invention.

FIG. 4 is a side view of the sand sled 10 of the present invention. Depicted is a side view of the sand sled 10 having a plurality of fastener attachments 34 providing means for varying the leash attachment depending on the weight being pulled. Also depicted is the spaced apart relation between the rail tiers 14 and the base 12 as determined by the stanchions 22.

Figure 5:
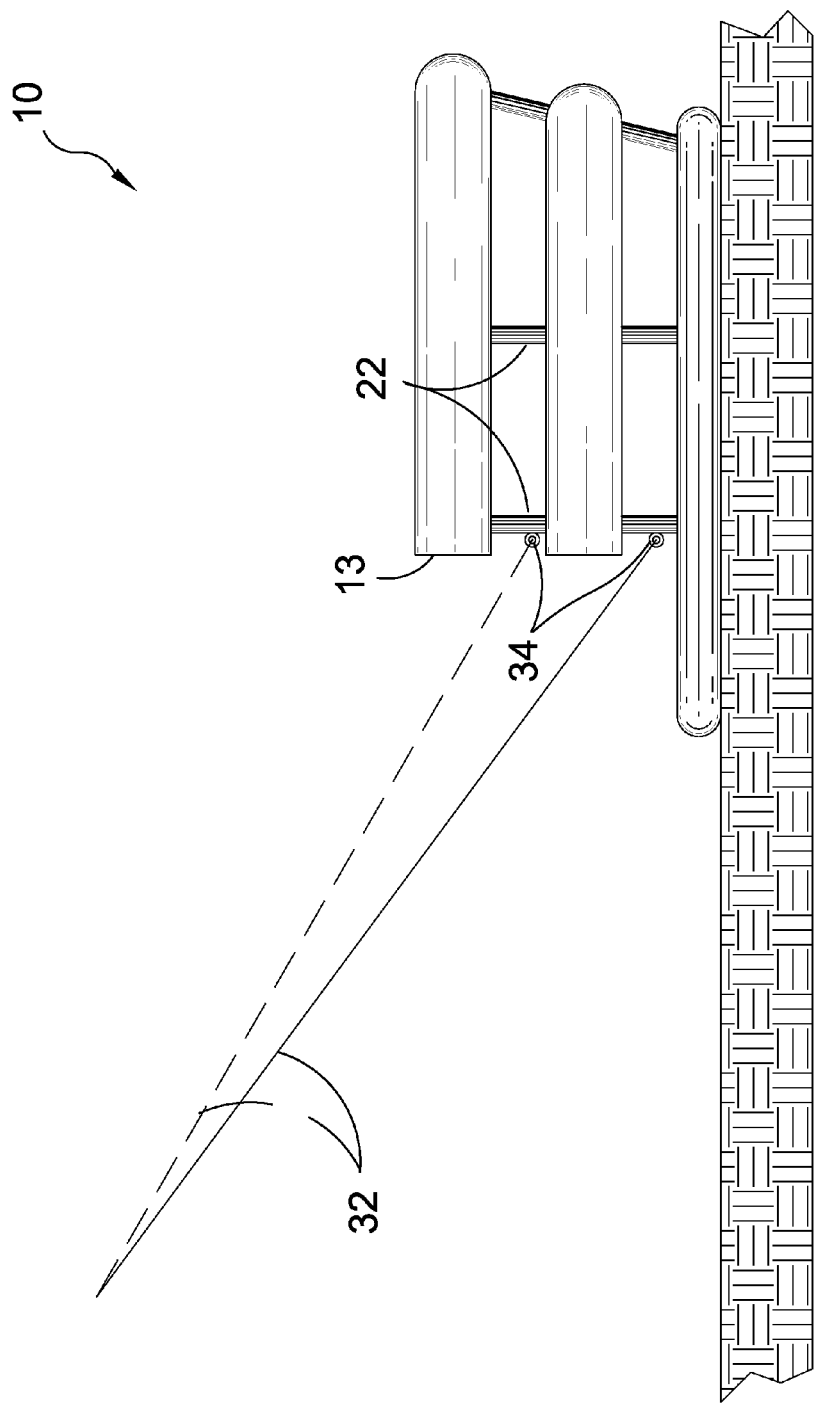
FIG. 5 is a side view of the sand sled of the present invention.

FIG. 5 is a side view of the sand sled 10 of the present invention. Depicted is a side view of the sand sled 10 having a plurality of fastener attachments 34 disposed on the stanchions 22 of the frame 13 providing means for varying the leash 32 attachment depending on the weight being transported.

Figure 6:
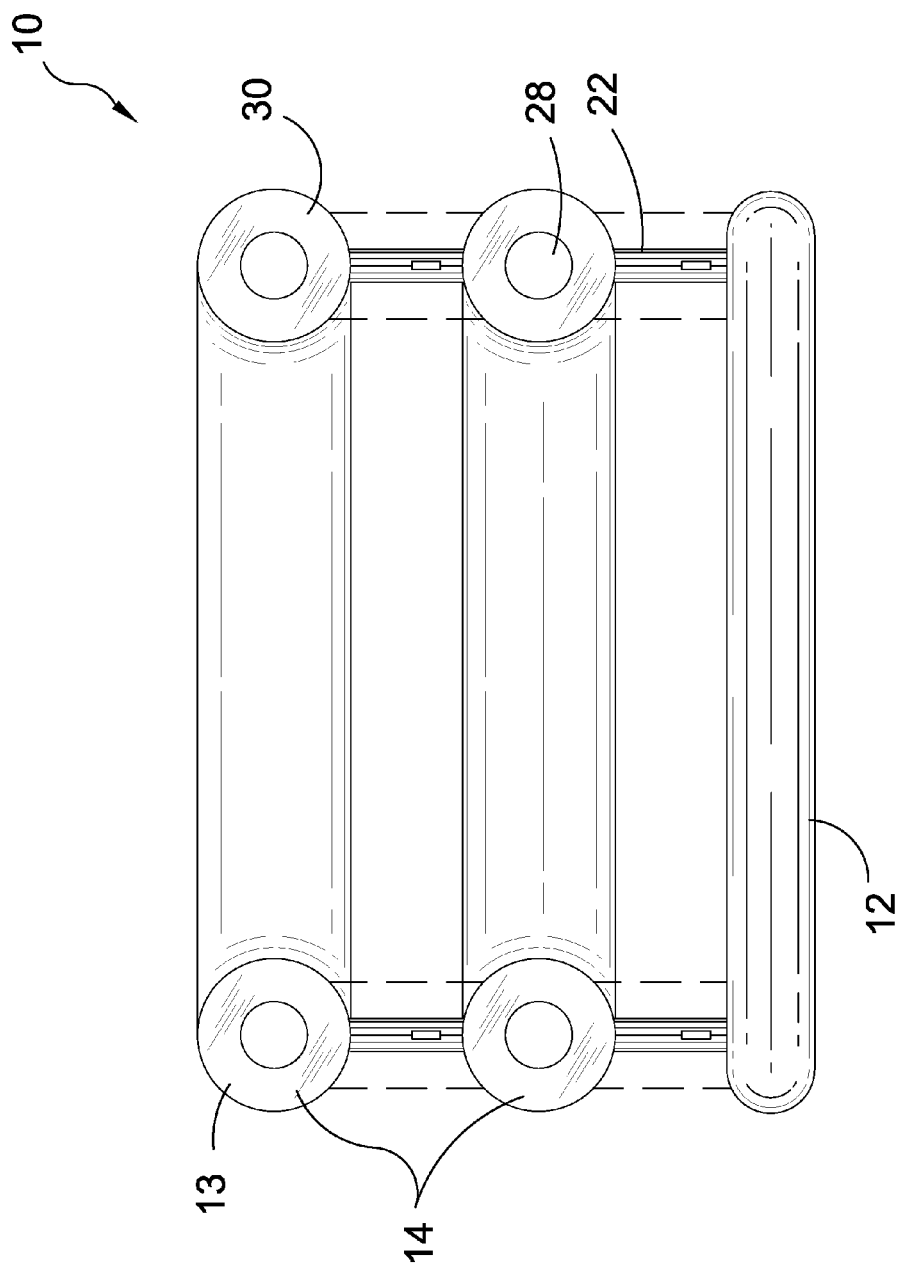
FIG. 6 is a front view of the sand sled of the present invention.

FIG. 6 is a front view of the sand sled 10 of the present invention. Shown is a front view of the sand sled 10 having a base 12 preferably comprising a polymeric or foam board having a frame 13 depending therefrom with the frame 13 having stanchions 22 and rails tiers 14 that comprise rigid cores 28 that are encompassed in whole or in part by soft tubular padding 30 serving as cushions for the rails and/or stanchions.

Figure 7:
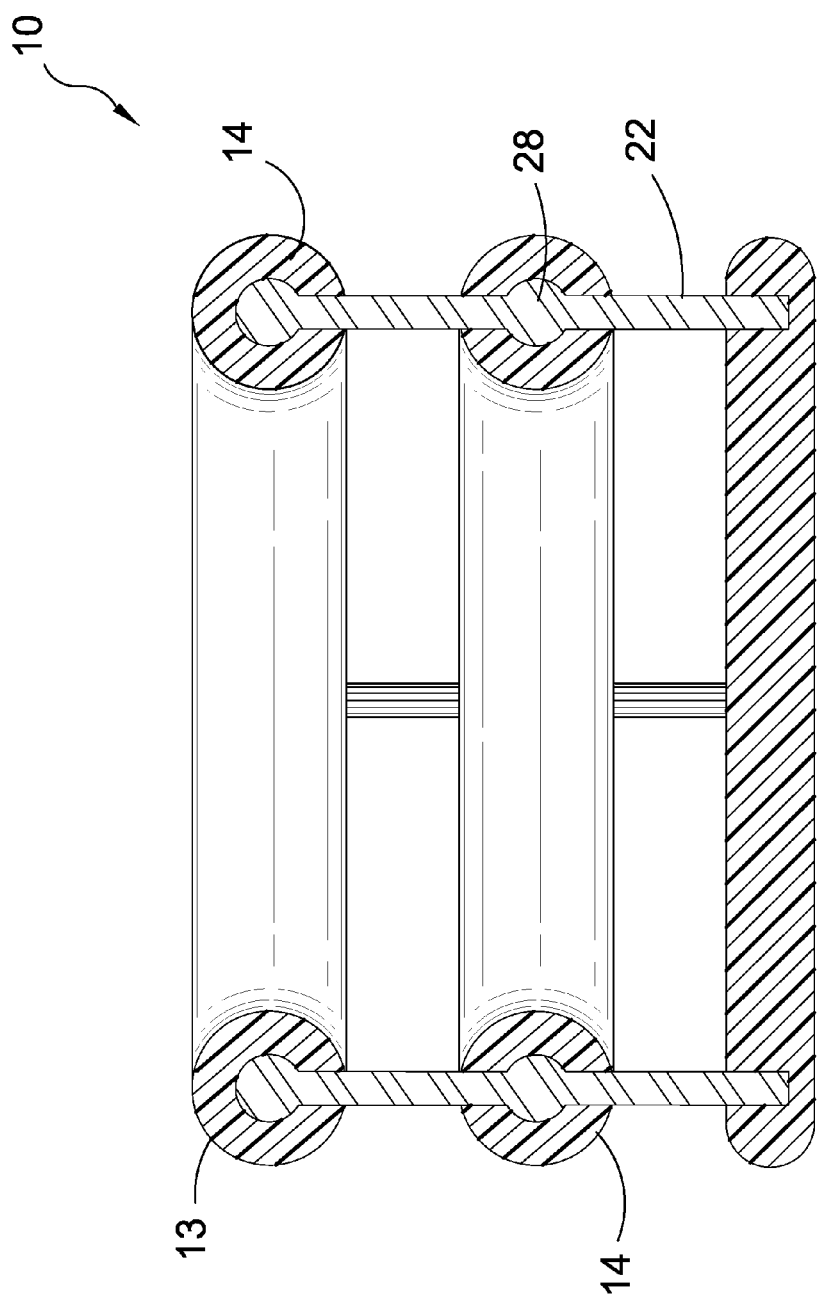
FIG. 7 is a sectional view of the sand sled of the present invention.

FIG. 7 is a sectional view of the sand sled 10 of the present invention. Shown is the frame 13 wherein the rigid core 28 of the rail tiers 14 and the stanchions 22 which may be unitary or segmented.

Figure 8:
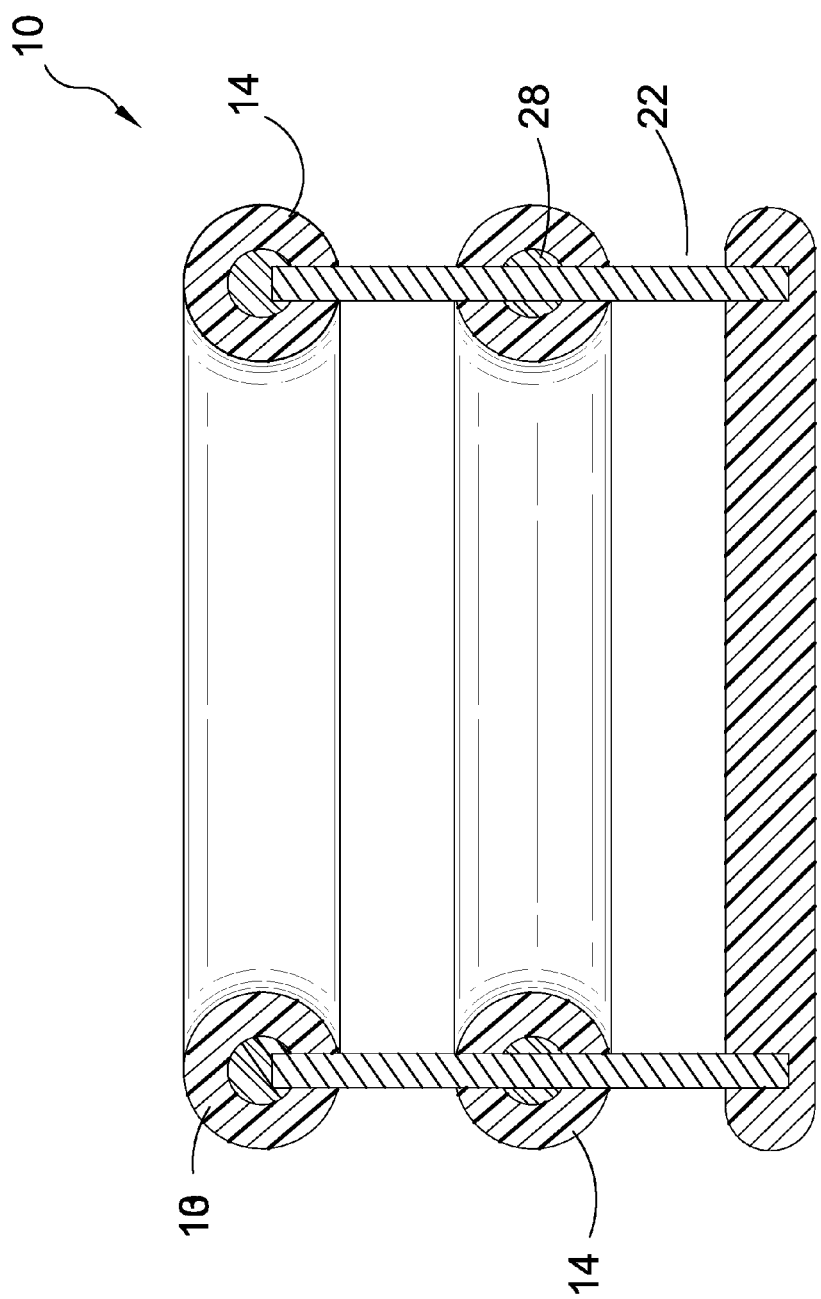
FIG. 8 is a sectional view of the sand sled of the present invention.

FIG. 8 is a sectional view of the sand sled 10 of the present invention. Shown is the frame 13 wherein the rigid core 28 of the rail tiers 14 and the stanchions 22 which may be unitary or segmented.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A sand sled for transporting a passenger or cargo over a sandy surface comprising:
   a) a substantially flat base having a front edge and a rear edge, said rear edge being rounded;
   b) a framework comprising bottom and top spaced tiers above and spaced from said base each said tier formed by a rail extending back from a midsection of said base to and beyond said rear edge of said base and being rounded along a rear of said base, said tiers being supported by spaced front and rear pairs of stanchions between said base and said bottom tier, and between said bottom tier and said top tier, both of said tiers extending beyond said rear edge of said base with said top tier extending further to the rear than said bottom tier;
   c) said rails and stanchions each comprising a rigid core surrounded by padding;
   d) a leash for pulling said sand sled across the sand; and
   e) means for securing said leash to said sand sled comprising fastening attachments at leading edges of a front pair of stanchions, with one set of fastening attachments in a fixed location below said bottom tier and another set of fastening attachments in a fixed location between said bottom and top tiers for varying attachment of said leash to enable a user to make leverage adjustments according to the load being pulled.

2. The sand sled according to claim 1, wherein said base is fabricated of a polymeric material.

3. The sand sled according to claim 1, wherein said base is a foam board.

4. The sand sled according to claim 1, wherein said base has substantially flat top and bottom surfaces.

\* \* \* \* \*